No. 847,144. PATENTED MAR. 12, 1907.
T. M. YARBROUGH & R. C. BRADLEY.
STALK CUTTER.
APPLICATION FILED JUNE 1, 1906.
2 SHEETS—SHEET 2.
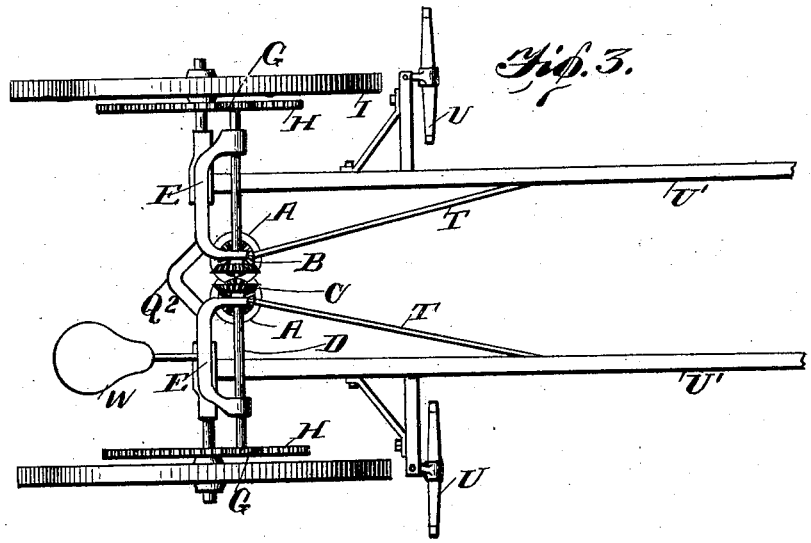
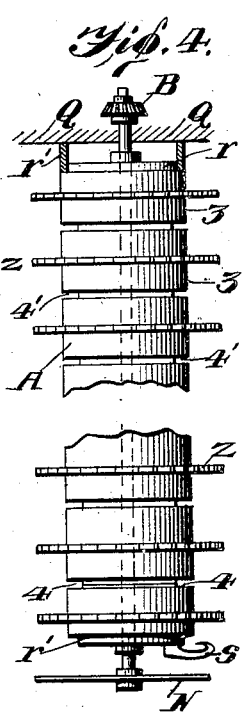
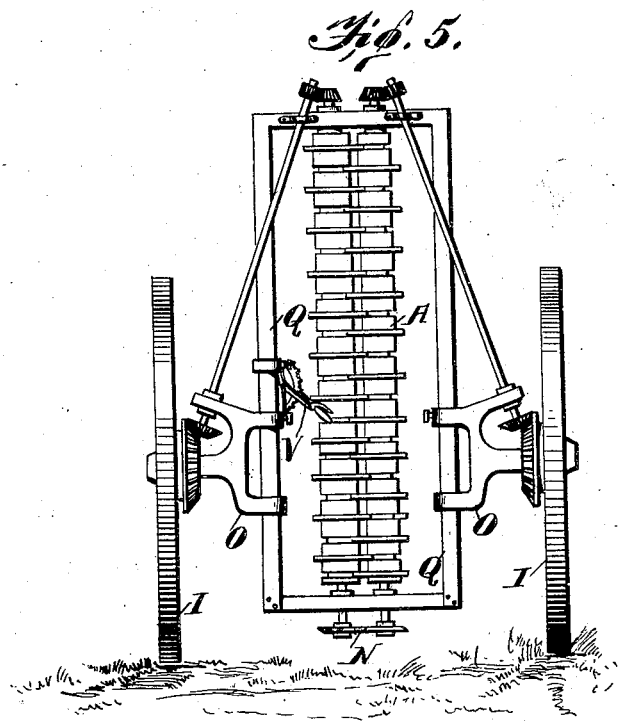
WITNESSES
INVENTORS
TODD M. YARBROUGH.
RICHARD C. BRADLEY.
ATTORNEYS

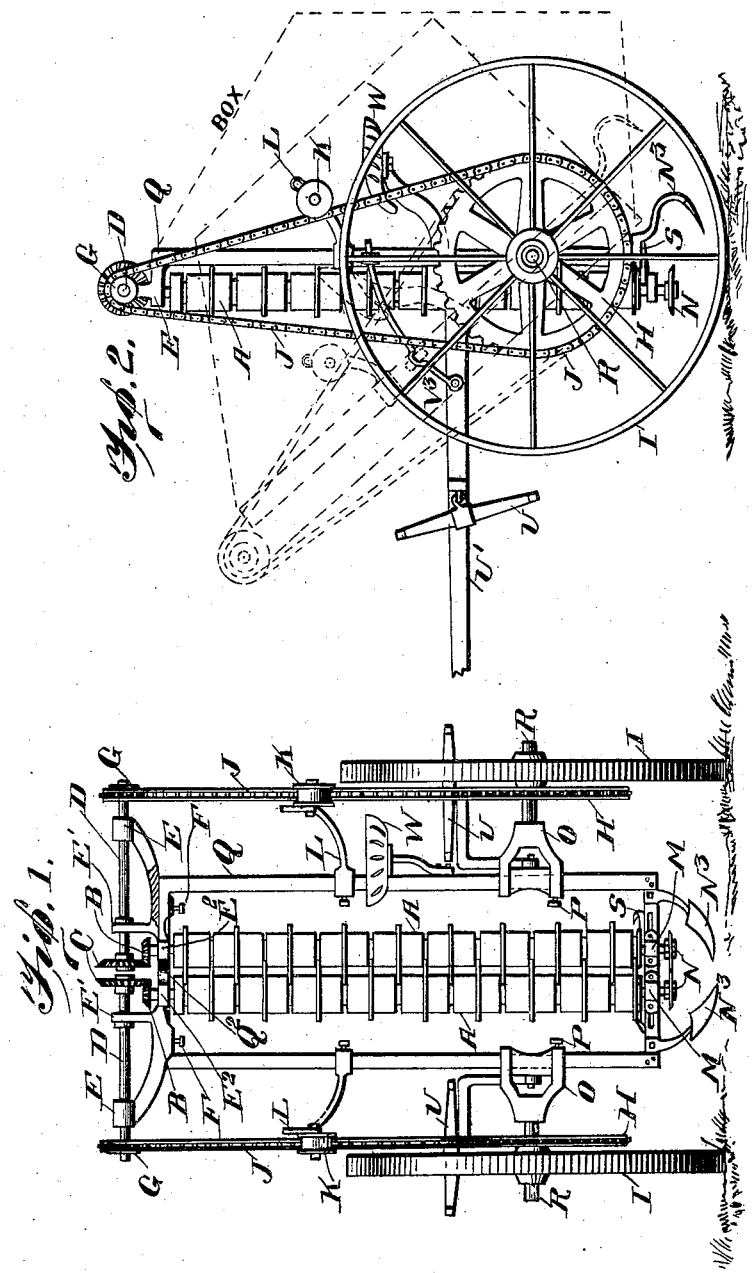

UNITED STATES PATENT OFFICE.

TODD M. YARBROUGH AND RICHARD C. BRADLEY, OF BOSSIER PARISH, LOUISIANA.

STALK-CUTTER.

No. 847,144.　　　Specification of Letters Patent.　　　Patented March 12, 1907.

Application filed June 1, 1906. Serial No. 319,713.

*To all whom it may concern:*

Be it known that we, TODD M. YARBROUGH and RICHARD C. BRADLEY, citizens of the United States, both residing in Bossier parish, Louisiana, (post-office address Vanceville, Louisiana,) have invented a new and useful Improvement in Stalk-Cutters, of which the following is a specification.

Our invention is in the nature of a machine to be drawn across a field by a double team for the purpose of cutting into small pieces the standing stalks of cotton, corn, &c., after the crop has been harvested; and it consists in the novel construction and arrangement of parts, which we will now proceed to describe with reference to the drawing, in which—

Figure 1 is a rear end elevation. Fig. 2 is a side elevation. Fig. 3 is a plan view. Fig. 4 is an enlarged detail of one of the cutting-rollers, and Fig. 5 is a rear elevation showing a modification.

In Fig. 1, A A represent two vertical and parallel rollers which are mounted at top and bottom in adjustable bearings held in place on an upright frame Q. The bearings E, E', and $E^2$ for each roller are all in one piece arranged to slide horizontally on the top of frame Q and are each held fast with a set-screw F. Bearings E and E' hold the horizontal shaft D in place and are adjustable with top of roller A. The frame Q is of rectangular shape of four bars fastened solidly together to hold the bearings for the rollers. The frame Q is carried on axles R by means of adjustable slides O, which can be slipped up and down on the vertical members of the frame and are held to place with set-screws P. Wheels I and I are held on the axles with set-collars on each side, allowing them to be adjusted laterally to suit conditions. Fastened to the inner side of each wheel I is a sprocket-wheel H and from H runs an endless chain J to a smaller sprocket G on the end of shaft D. The chain J is tightened with idler K, which is held on arm L, attached to frame Q. A slot in the arm L allows for movement of idler K to tighten chain, as seen in Fig. 2.

M, Fig. 1, is a bearing holding the bottom of each roller whose lower axle ends extend through the bearings M and are provided with heavy saws N, attached with nuts, so as to revolve with the rollers. S are hooks fastened to rollers A at the bottom, so as to miss each other when revolving. These hooks catch the stalks and pull them in to the rollers and help to break the bottom part of the stalks. B and C are bevel-gears fastened to rollers A and shafts D. W is the driver's seat. U are swingletrees to hitch the horses to. U' U' are two parallel tongues between which are set the inclined guards T T, Fig. 3, which converge to form a vertical throat in front of the adjacent cutter-rollers so as to guide the stalks between the same.

The operation of the machine is as follows: The wheels roll on the ground on each side o: the row of cotton or cornstalks. The motion is transmitted from the wheels to shafting D by chains and by the two sprockets H and G. The motion of the shafts D is transmitted to rollers A and A by bevel-gears C and B, thereby making the rollers move at high speed. The rollers (see Fig. 4) are made in sections 3, of wood or iron, or both, clamped on central shafts and so arranged that the sections can be removed to allow circular toothed saws Z or cutters to be placed between the sections at any given distance apart. Between the roller-sections are formed circular grooves 4 4', which may be formed by recessing the edges of the sections, as at 4, or by inserting a small disk between the sections, as at 4', as seen in Fig. 4. When the rollers are adjusted close to each other, the rollers act as crushers and also leave the cutters intact, as the cutters of one roller enter the grooves of the other roller. The dirt-saws N at the bottom of the shaft are arranged to cut the stalks off at the bottom above or below ground, and these saws may be removed. The end sections at the top and bottom of the rollers have a recess $r$, Fig. 4, for a small stiff circular collar $r'$ to lay in, which collar is stationary and is fastened to frame Q or to bearings $E^2$ and M. The collar is designed to keep the stalks from going under the bearings or hanging between the rollers A and frame Q. The roller-sections are secured together by a clamp-nut on each shaft, and the saws are held in place with pins or by clamping-nuts, or friction. In Fig. 3 is shown an offset $Q^2$ in the frame Q, which sets to the rear and is made to keep anything from clogging in rollers at each end. This offset is at bottom and top and gives clearance to the rollers at these points. The dotted line (marked "Box," Fig. 2) shows how a receiving-box with a dump-bottom can be attached, if needed, to carry the cut-up stalks out to the end of the row. As the horses walk on each side of the row, the wheels I, following the tracks, allow the cotton to come between the horses and enter the guides T, which bring the stalks in touch with the rollers and cutters, which are moving at high speed. The rollers force the stalk through the small space between them, breaking and cutting the stalks to pieces, and the speed of the rollers throws the cut-up pieces with considerable force back into the box and fills it from back of the box up to the rollers.

Fig. 5 shows a modification in which the power of the wheels can be transmitted to rollers directly by inclined shafts and bevel-gears. Many modifications of the means for transmitting the power from wheels to the rollers may be used.

V, Fig. 5, shows a lever with catch and rack-bar to raise and lower the frame Q, if needed. All gears can be hooded to protect them, and a similar hood or screen may be provided for the driver.

When the machine is to be transported, the gears are to be disconnected by any suitable clutches (not shown) and the frame Q, with the rollers, is tilted to the forwardly-inclined position. (Shown in dotted lines in Fig. 2.) The upright or inclined position of the frame and rollers is determined by curved braces V³, connecting the tongues to the frame and provided with suitable locking devices.

N³ is a removable plow for dislodging roots. It is attached to the lower part of the frame, as seen in Fig. 2.

The rollers, arranged in a vertical position and moving at a high speed, cut the stalks to any size and crushing them, if needed. The rollers, being adjustable, may be opened or closed at will, making a stalk-cutter that can be changed at will so as to suit the density of the work, as well as the size of pieces the stalk is cut into. By crushing the stalk, cutting up the same, and delivering it to the end of the row, it is believed that the machine will be a great assistance in destroying the boll-weevil, as the stalk is destroyed in its green stage.

The machine requires no more power than any ordinary plow, and is therefore not an expensive machine to operate.

The machine can be used to top and cut millet, sorghum, okra, and other products grown in and about plantations and farms and is not limited to cotton and corn.

It is understood that we are not to be limited to numbers of rollers or any given angle of rollers in building the machine, also the power is not to be limited to horse-flesh, but that mechanical power can be used.

We claim—

1. A stalk-cutter, comprising two upright parallel shafts bearing horizontal rotary cutters throughout their length, the rotary cutters of one shaft alternating with and extending past the rotary cutters of the other shaft, wheels supporting the same and separate gears connecting the wheels to the shafts.

2. A stalk-cutter comprising two upright parallel shafts bearing horizontal rotary cutters through their length, horizontal shafts at the upper ends of said upright shafts and connected to and driving the same, a supporting-frame with running-wheels and separate chain belts connecting the running-wheels to the horizontal shafts.

3. A stalk-cutter, comprising two upright parallel shafts bearing horizontal rotary cutters throughout their length, the rotary cutters of one shaft alternating with and extending past the rotary cutters of the other shaft, a rectangular frame supporting the same, horizontally-adjustable bearings for each shaft to render them adjustable to and from each other, supporting and driving wheels and gears connecting said wheels to the shafts.

4. A stalk-cutter, comprising two upright parallel shafts bearing horizontal rotary cutters throughout their length, the rotary cutters of one shaft alternating with and extending past the rotary cutters of the other shaft, a frame supporting the same, wheels supporting the frame and having each an attached sprocket-wheel, chain belts connecting with the sprocket-wheels, and horizontal shafts at the top of the frame having their inner ends connected to the rotary cutter-shafts and their outer ends provided with sprocket-wheels connected with the chain belts.

5. A stalk-cutter having a pair of upright rollers constructed with alternating grooves and rotary cutters, the rotary cutters of one roller entering the grooves of the other roller, and driving-gears and supporting-wheels for operating the same.

6. A stalk-cutter having a pair of upright shafts with horizontal rotary cutters distributed along their length, the rotary cutters of one shaft alternating with and extending past those of the other shaft, a frame supporting the same, bearings for the upper and lower ends of the shafts and rotary cutters arranged on the lower ends of the shafts below their lower bearings, supporting-wheels for the frame and gears connecting the wheels to the cutter-shafts.

7. A stalk-cutter, comprising a pair of upright shafts with horizontal rotary cutters, an upright rectangular frame, axles each having a separate adjustable connection with the upright members of the frame and provided with supporting-wheels and gears connecting the said wheels to the cutter-shafts.

8. A stalk-cutter, comprising a pair of upright shafts with rotary cutters, an upright rectangular frame, axles connecting with the side members of said frame and bearing supporting-wheels, two upper journal-frames, each having two bearings for a horizontal shaft and a bearing for the upright cutter-shaft, means for adjusting said triple-bearing frames horizontally on the rectangular frame, and two horizontal shafts with gears connecting the supporting-wheels and upright cutter-shafts.

9. A stalk-cutter, comprising two upright shafts with rotary cutters, an upright frame having a rear offset or bend at a point between the cutter-shafts, supporting-wheels for the frame and means for driving the cutter-shafts from the supporting-wheels.

10. A stalk-cutter, comprising two upright rollers made in sections with rotary cutters clamped between the sections and means for driving the same.

11. A stalk-cutter having two upright parallel shafts with rotary cutters distributed along their length for cutting up the stalks into short bits, a frame supporting the same and a root-plow at the lower end of said frame for digging up the roots of the cut stumps of the stalks.

12. A stalk-cutter, comprising two upright shafts bearing rotary cutters along their length, an upright frame supporting the same, axles with supporting-wheels connected to the upright frame, gears connecting the wheels with the upright cutter-shafts, two tongues connected to the upright frame and having convergently-arranged guards or shields between them and draft connections secured to the outer sides of the tongues.

TODD M. YARBROUGH.
RICHARD C. BRADLEY.

Witnesses:
ROBERT B. HILL,
JOANNES SMITH.